United States Patent
Colosimo

(10) Patent No.: US 10,488,733 B2
(45) Date of Patent: Nov. 26, 2019

(54) LONG RANGE ELECTROMAGNETIC RADIATION SENSOR HAVING A CONTROL SYSTEM TO HEAT AND/OR IONIZE THE AIR WITHIN THREE-DIMENSIONAL PORTIONS OF AN ATMOSPHERIC VOLUME

(71) Applicant: BAE Systems plc, London (GB)

(72) Inventor: Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 157 days.

(21) Appl. No.: 15/564,037

(22) PCT Filed: Apr. 7, 2016

(86) PCT No.: PCT/GB2016/050967
§ 371 (c)(1),
(2) Date: Oct. 3, 2017

(87) PCT Pub. No.: WO2016/162673
PCT Pub. Date: Oct. 13, 2016

(65) Prior Publication Data
US 2018/0088436 A1    Mar. 29, 2018

(30) Foreign Application Priority Data

Apr. 10, 2015  (EP) ..................................... 15275114
Apr. 10, 2015  (GB) ..................................... 1506081.7

(51) Int. Cl.
*G02F 1/29* (2006.01)
*G02B 23/02* (2006.01)
*G02B 27/09* (2006.01)

(52) U.S. Cl.
CPC ............... *G02F 1/29* (2013.01); *G02B 23/02* (2013.01); *G02B 27/0944* (2013.01); *G02B 27/0955* (2013.01); *G02B 27/0977* (2013.01)

(58) Field of Classification Search
CPC .................................................................
G02B 27/0944; G02B 27/0955; G02B 23/00; G02B 23/02; G02B 27/0977; G02F 1/29; G02F 1/293
(Continued)

(56) References Cited

U.S. PATENT DOCUMENTS 4,686,605 A    8/1987 Eastlund
4,999,637 A    3/1991 Bass
(Continued)

FOREIGN PATENT DOCUMENTS

DE    10245682 A1    4/2004
WO    9428361 A1    12/1994
(Continued)

OTHER PUBLICATIONS

European Search Report of European Application No. EP15275116.0, dated Sep. 17, 2015, 7 pages.
(Continued)

*Primary Examiner* — Que Tan Le
(74) *Attorney, Agent, or Firm* — Maine Cernota & Rardin

(57) ABSTRACT

A long range electromagnetic radiation sensor apparatus comprising a sensing system for receiving electromagnetic radiation signals from an object or area of interest and at least one electromagnetic radiation sensor, the apparatus further comprising an electromagnetic radiation source and a control system configured to cause electromagnetic radiation from said source to be applied to a selected plurality of three-dimensional portions of an atmospheric volume between said optical system and said object or area of interest (204) so as to heat and/or ionise the air within said portions, wherein said selected portions are spatially located together in a three-dimensional configuration so as to simulate an electromagnetic radiation path modifying device (202) for capturing said electromagnetic signals from said
(Continued)

object or area of interest and directing and/or converging said captured signals toward said electromagnetic radiation sensor of said sensing system.

15 Claims, 9 Drawing Sheets

(58) Field of Classification Search
USPC .................. 250/203.1, 203.2, 203.6, 216
See application file for complete search history.

(56) References Cited

U.S. PATENT DOCUMENTS

| | | | |
|---|---|---|---|
| 5,041,834 A | 8/1991 | Koert | |
| 5,269,288 A | 12/1993 | Stirbl et al. | |
| 5,415,156 A | 5/1995 | Stirbl et al. | |
| 5,593,549 A | 1/1997 | Stirbl et al. | |
| 5,684,621 A | 11/1997 | Downing | |
| 8,981,261 B1 | 3/2015 | Tillotson | |
| 9,305,378 B1 * | 4/2016 | Holmes | H04N 5/2254 |
| 2004/0135744 A1 | 7/2004 | Bimber | |
| 2009/0009862 A1 | 1/2009 | Hong | |
| 2009/0171477 A1 | 7/2009 | Nayfeh et al. | |
| 2010/0258708 A1 | 10/2010 | Meyers et al. | |
| 2011/0001429 A1 | 1/2011 | Davis | |
| 2011/0121158 A1 | 5/2011 | Corke et al. | |
| 2014/0224776 A1 | 8/2014 | Elhadj | |
| 2014/0327747 A1 | 11/2014 | Kong | |
| 2014/7011854 | 4/2017 | Kuri | |
| 2017/0212602 A1 | 7/2017 | Hsu | |
| 2018/0128908 A1 | 5/2018 | Blanchard | |

FOREIGN PATENT DOCUMENTS

| | | | |
|---|---|---|---|
| WO | 2002056111 A1 | 7/2002 | |
| WO | 2011057342 A1 | 5/2011 | |
| WO | 2011063407 A2 | 5/2011 | |
| WO | 2013039465 A1 | 3/2013 | |

OTHER PUBLICATIONS

Great Britain Search Report of Great Britain Application No. GB1506085.8, dated Oct. 21, 2015, 3 pages.
PCT Search Report for PCT Application No. PCT/GB2016/051003, dated May 24, 2016, 13 pages.
Berreman, D.W., "A Lens or Light Guide Using Convectively Distorted Thermal Gradients in Gases", Bell System Technical Journal, vol. 43, issue 4, pp. 1469-1475, Jul. 1964.
International Preliminary Report on Patentability of Internatinal Application No. PCTGB2016050948, dated Oct. 10, 2017, 8 pages.
International Preliminary Report on Patentability of International Application No. PCTGB2016050873, dated Oct. 19, 2017, 8 pages.
International Preliminary Report on Patentability of International Application No. PCTGB2016050980, dated Oct. 19, 2017, 6 pages.
International Preliminary Report on Patentability of International Application No. PCTGB2016050984, dated Oct. 19, 2017, 10 pages.
International Preliminary Report on Patentability of International Application No. PCTGB2016051003, dated Oct. 19, 2017, 9 pages.
International Search Report and Written Opinion of International Application No. PCT/GB2016/050948, dated Jun. 2, 2016, 12 pages.

European Search Report of European Application No. EP15275113, dated Sep. 18, 2015, 6 pages.
Great Britain Search Report of Great Britain Application No. GB1506079.1, dated Oct. 5, 2015, 3 pages.
"Atmospheric lensing. A Weapon of Selective Destruction" by Steven J. Smith, Nov. 29, 2010. https://web.archive.org/web/20101129164210/http://whale.to/b/atmospheric_lensing.html, accessed on Mar. 10, 2015.
"Can we use atmospheric lenses as telescopes?" online discussion, last comment 30/10/14, http://www.thenakedscientists.com/forum/index.php?topic=52568.0, accessed on Mar. 10, 2015.
International Search Report and Written Opinion of International Application No. PCT/GB2016/050967, dated Jun. 1, 2016, 13 pages.
Brian W. Neiswander et al: "Plasma Lens for Optical Path Difference Control", AIAA Journal, vol. 50, No. 1, Jan. 1, 2012, pp. 123-130, XP055212822.
Bejot P et al: "32TW atmospheric white-light laser", Applied Physics Letters, American Institute of Physics, vol. 90, No. 15, Apr. 10, 2007, pp. 151106-151106.
Great Britain Search Report of Great Britain Application No. GB1506081.7, dated Oct. 8, 2015, 3 pages.
European Search Report of European Application No. EP15275114, dated Sep. 17, 2015, 8 pages.
International Search Report and Written Opinion of International Application No. PCT/GB2016/050984, dated Jun. 8, 2016, 15 pages.
Anonymous: "Plasma stealth—Wikipedia, the free encyclopedia", Mar. 21, 2015, XP055245259, Retrieved from the internet: https://en.wikipedia.org/wiki/Plasma_stealth.
Bhaskar Chaudhury et al: "Stidy and Optimization of Plasma-Based Radar Cross Section Reduction Using Three-Dimensional Computations", IEEE Transactions on Plasma Science, IEEE Service Center, Piscataway, NJ, US, vol. 37, No. 11, Nov. 1, 2009, pp. 2116-2127.
Great Britain Search Report of Great Britain Application No. GB1506199.7, dated Sep. 30, 2015, 4 pages.
European Search Report of European Application No. EP15275181, dated Jan. 28, 2016, 10 pages.
International Search Report and Written Opinion of International Application No. PCT/GB2016/050980, dated Jun. 10, 2016, 15 pages.
Anonymous: "Deflector Shield—Wookieepedia—Wikia", 1999, XP055244465, Retrieved from the internet: URL:http://starwars.wikia.com/wiki/Deflector_shield/Legends.
Great Britain Search Report of Great Britain Application No. GB1506200.3, dated Sep. 30, 2015, 5 pages.
European Search Report of European Application No. EP15275183, dated Jan. 26, 2016, 10 pages.
International Search Report and Written Opinion of International Application No. PCT/GB2016/050873, dated May 31, 2016, 13 pages.
Baris I. Erkmen: "Computational ghost imaging for remote sensing", Hournal of the Optical Society of America A, vol. 29, No. 5, May 1, 2012, pp. 782-6600, XP055219044.
Baoqing Sun et al: "Normalized ghost imaging", Optics Express, vol. 20, No. 15, Jul. 16, 2012, p. 16892, XP055219055.
Great Britain Search Report of Great Britain Application No. GB1506089, dated Sep. 3, 2015, 3 pages.
European Search Report of European Application No. EP15275119, dated Oct. 12, 2015, 7 pages.

* cited by examiner

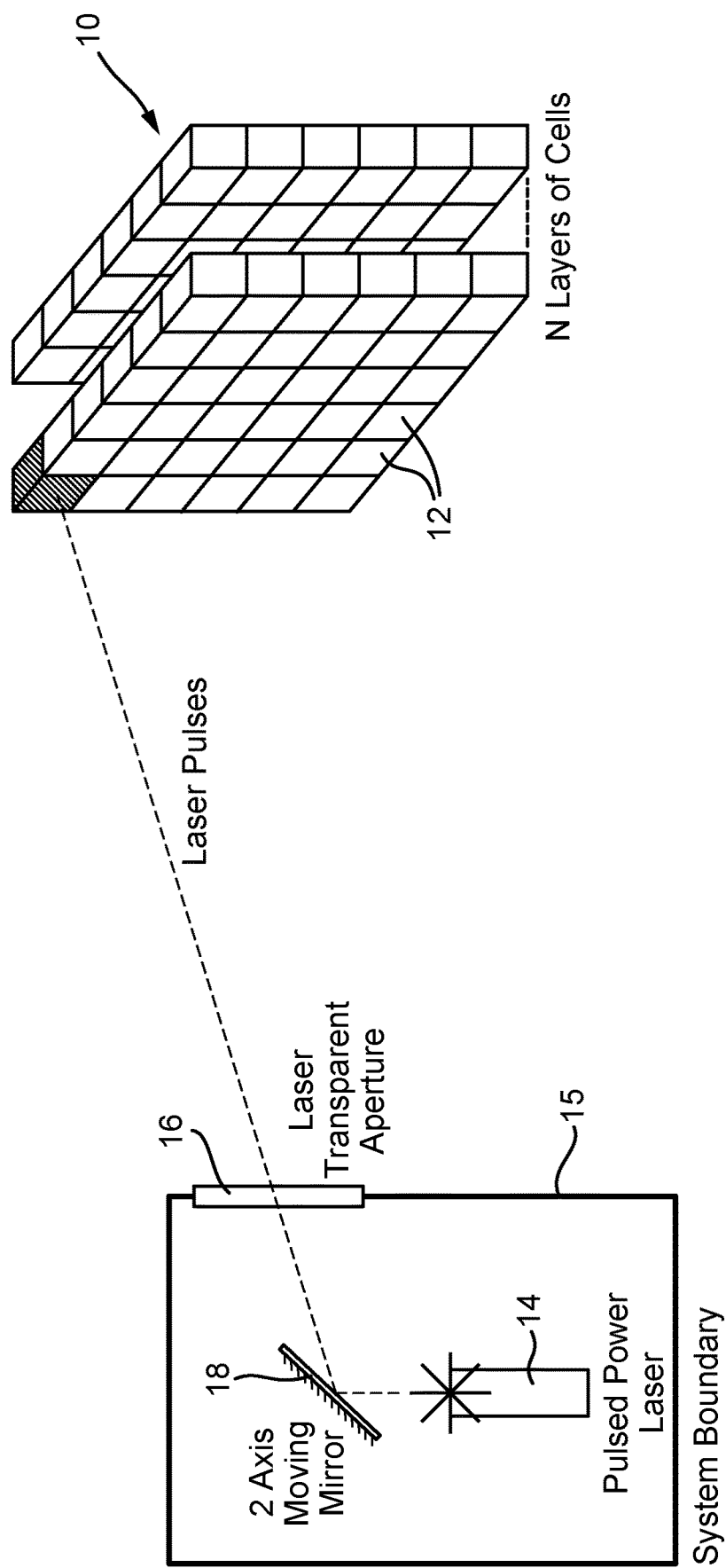

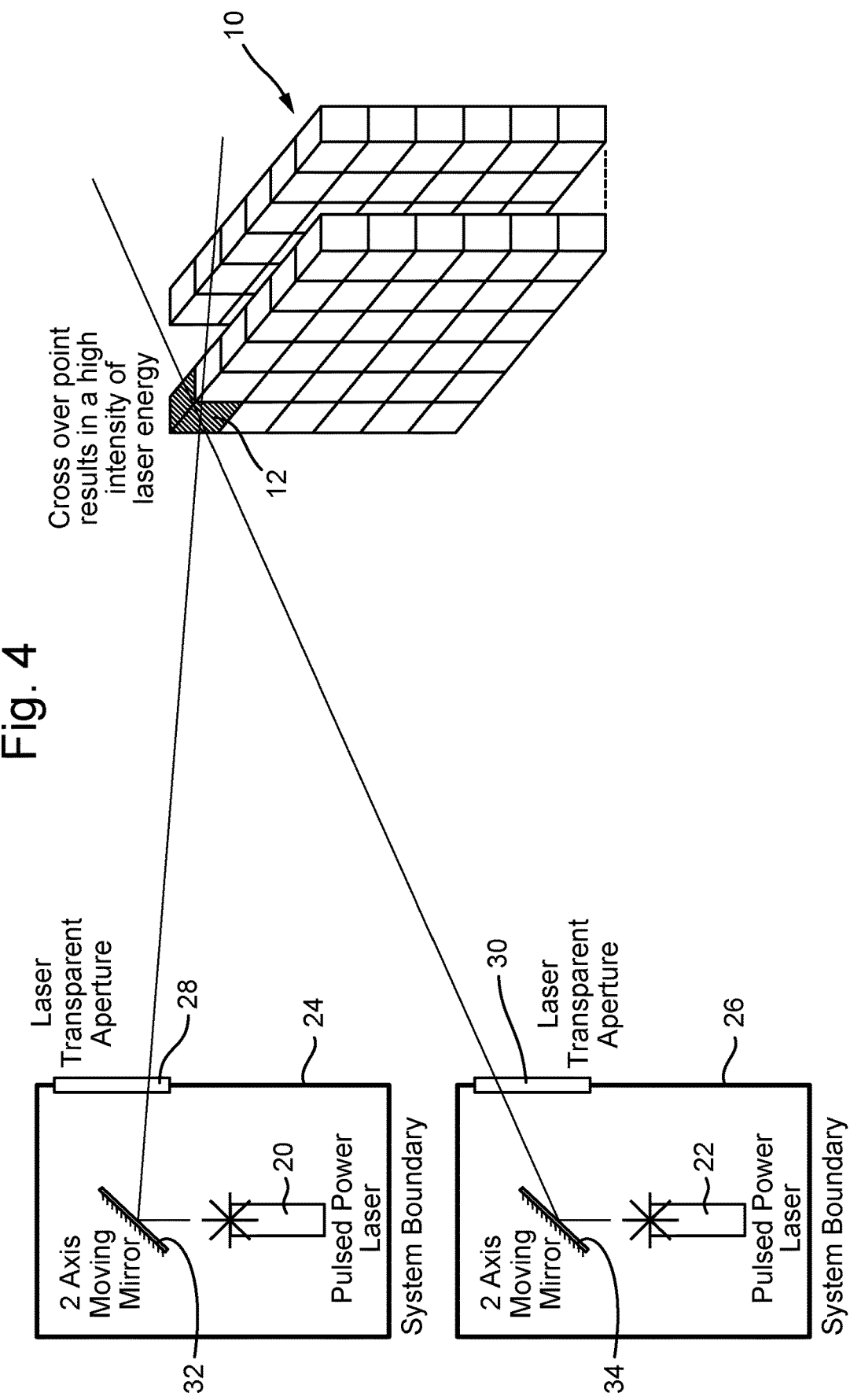

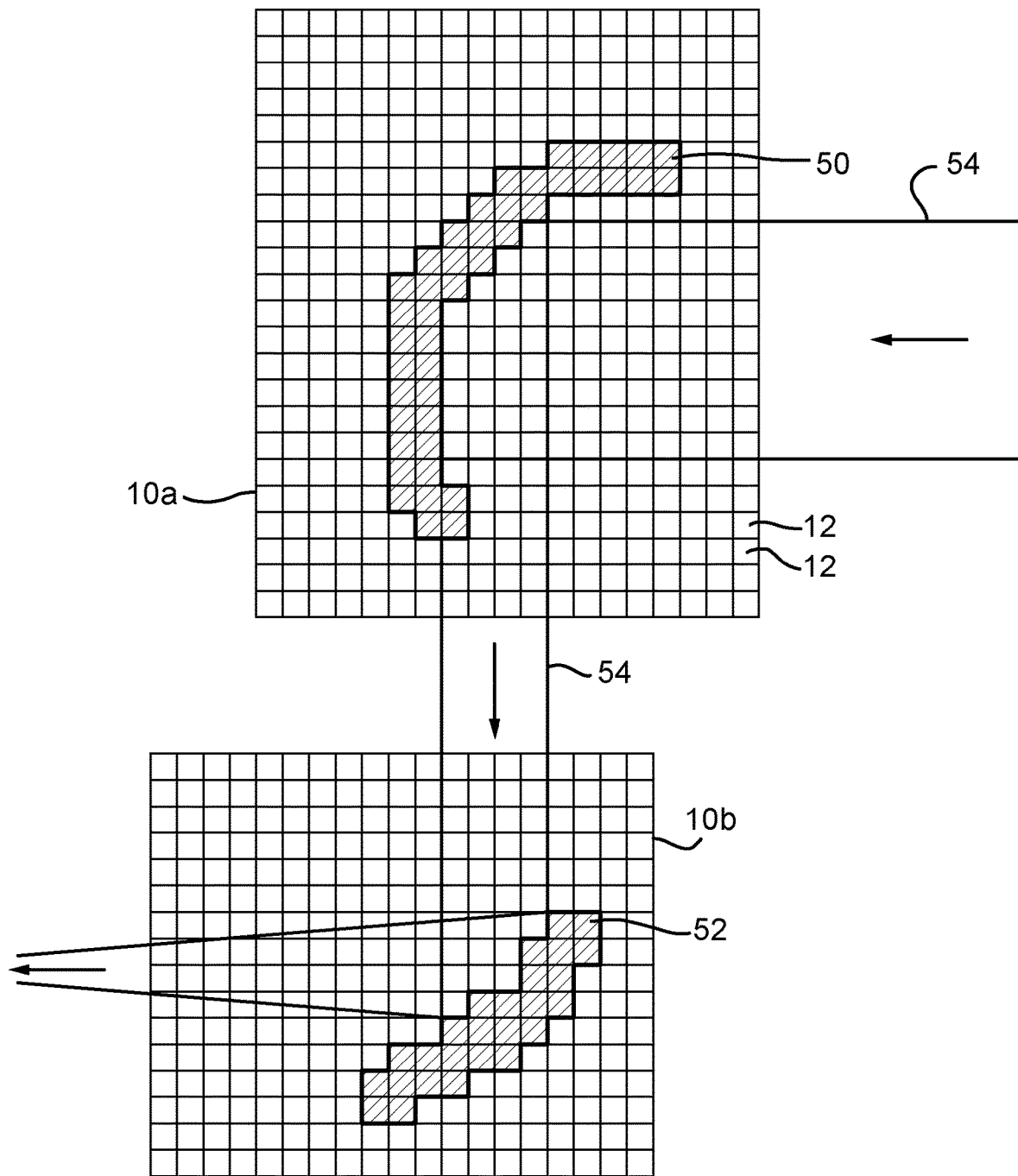

LONG RANGE ELECTROMAGNETIC RADIATION SENSOR HAVING A CONTROL SYSTEM TO HEAT AND/OR IONIZE THE AIR WITHIN THREE-DIMENSIONAL PORTIONS OF AN ATMOSPHERIC VOLUME

RELATED APPLICATIONS

This application is a national phase application filed under 35 USC § 371 of PCT Application No. PCT/GB2016/050967 with an International filing date of Apr. 7, 2016 which claims priority of GB Patent Application 1506081.7 filed Apr. 10, 2015 and EP Patent Application 15275114.5 filed Apr. 10, 2015. Each of these applications is herein incorporated by reference in its entirety for all purposes.

FIELD OF THE INVENTION

This invention relates generally to a long range sensor apparatus and method of providing same for use in receiving electromagnetic signals, such as visible light from a scene as required in, for example, telescopes used in astronomy or image capture systems on airborne platforms.

BACKGROUND OF THE INVENTION

Telescopes and similar long range sensing devices are well known. Such devices typically comprise a primary objective lens, spaced apart from the main optical system and configured to collect photons and converge or otherwise guide and focus the collected electromagnetic radiation signals to, for example, a focal plane array (FPA), located on the focal plane, for sensing. Referring to FIGS. 1A, 1B and 1C of the drawings, many different types of telescope (or other long range sensor) exist.

Thus, referring first to FIG. 1A of the drawings, a refracting telescope (or other long range sensor) comprises a converging lens 12 as its primary objective lens. The lens 12 could be refractive and, in the illustrated case, a double convex lens, or it could be diffractive in the form of, for example, a Fresnel zone plate or the like. Light 10 from a scene is collected by the lens 12 and converged to its focal point F. The physical arrangement of the device is such that the location of the focal point or plane of the lens 12 corresponds to that of the detector 14 of the optical system which may be a focal plane array (FPA) or the like. Thus, the distance between the lens 12 and the FPA of the optical system is dictated by the focal length of the lens 12 which, in turn is dictated by its size and optical characteristics (both of which are fixed).

Referring to FIG. 1B of the drawings, a reflective telescope or sensor arrangement comprises a pair of mirrors: a first, concave mirror 16 and a second, (for example) planar mirror 18 mounted at an angle relative to the incident light path. Light (or other electromagnetic radiation) is collected by the concave mirror 16 and directed back to the planar mirror 18, which is oriented at an angle to cause the radiation to be directed and focussed to a point corresponding once again to the FPA of the device. It will be appreciated, of course, that the mirrors 16, 18 can be of any desired size, shape and/or orientation to achieve the required beam direction and focussing.

Referring to FIG. 1C of the drawings, in a third arrangement, known in the art as catadioptric, a first concave mirror 22 and a second, opposing convex mirror 20 are provided in the configuration shown. The concave mirror 22 is provided with a generally central aperture 23. Light 10 is collected by the portion of the concave mirror 22 around the aperture 23 and reflected and converged toward the convex mirror 20. The light is then reflected back by the convex mirror 20 and converged to its focal point F, once again corresponding to the location of the FPA of the optical system.

Other configurations of telescope and long range sensors and image capture devices are known, having varying configurations of optical devices to capture and then focus electromagnetic radiation to a focal plane on which is located an imaging detector, for example, a focal plane array (FPA) for sensing. In all cases, the angular resolution is dependent on the focal length achievable. Focal length is defined as the distance between the centre of a lens or curved mirror and its focal point, or the equivalent distance in a compound lens or telescope. The larger the focal length, the greater will be the angular resolution of the device. Equally, the larger the primary objective lens or mirror (or other optical device used to 'collect' electromagnetic radiation), the better the quality of the sensed signal will be. In other words, the larger the collecting device, the better will be the quality of the collected signal, and the greater the focal length, the greater will be the magnification of the collected signal. Thus, the overall quality of the system is primarily dependent on the size of the collecting device and the focal length of the optical system.

However, in conventional sensor systems, the size of the primary objective lens and the focal length of the optical system are fixed and constrained by the physical apparatus in which it is mounted and the size of the lens which can be provided therein. Thus, the optical properties and capabilities of conventional sensors are fixed and limited by physical constraints. On the other hand, there is an ongoing desire to increase the range and angular resolution of telescopes and other long range sensors, which can currently only effectively be achieved by increasing the size of the overall apparatus, which can be undesirable in many applications and, in others, simply not practicable. It is an object of aspects of the present invention to at least address these issues.

SUMMARY

In accordance with an aspect of the present invention, there is provided a long range electromagnetic radiation sensor apparatus comprising a sensing system for receiving electromagnetic radiation signals from an object or area of interest and at least one electromagnetic radiation sensor, the apparatus further comprising an electromagnetic radiation source and a control system configured to cause electromagnetic radiation from said source to be applied to a selected plurality of three-dimensional portions of an atmospheric volume between said optical system and said object or area of interest so as to heat and/or ionise the air within said portions, wherein said selected portions are spatially located together in a three-dimensional configuration so as to generate an electromagnetic radiation path modifying atmospheric element for capturing said electromagnetic signals from said object or area of interest and directing and/or converging said captured signals toward said electromagnetic radiation sensor of said sensing system.

The selected portions may be spatially located together in a substantially unbroken three-dimensional configuration corresponding to the three-dimensional shape of the generated electromagnetic radiation path modifying atmospheric element. In alternative exemplary embodiments, the selected portions may be configured such that the non-selected portions are in a configuration corresponding to a three-dimensional shape of the generated electromagnetic radiation path modifying atmospheric element.

In an exemplary embodiment of the sensing system is an optical system, and the electromagnetic radiation path atmospheric element generated by said selected portions may be an optical lens, wherein the control system may be configured to cause electromagnetic radiation from said source to be applied to said selected plurality of three-dimensional portions so as to heat and/or ionise the air therein and change the refractive index thereof.

The optical lens generated by the selected portions may be a converging lens and said selected portions may be spatially located together in a concave lens configuration. Alternatively, in this case, the non-selected portions may be spatially located together in a convex lens configuration. Thus, the present invention operates on principles that can be thought of as inverse to those used in conventional lenses. In a conventional (e.g. glass) lens, the lens medium is denser and, therefore, has a higher refractive index than the surrounding air. In the case of the present invention, the heated and/or ionised portions are less dense and, therefore, have a lower refractive index than the surrounding air. In this case, therefore, a converging lens would either have a heated and/or ionised portion of a concave or double concave shape (like a conventional diverging lens) or the air around a convex or double convex region (i.e. the conventional shape of a converging lens) is heated and/or ionised such that the refractive index of the surrounding air is less than that of the convex region, thereby ensuring a converging effect when an electromagnetic radiation beam passes into the atmospheric volume thus treated.

The optical element generated by said selected portions may be a diffractive lens and said selected portions may define a plurality of three-dimensional shapes, each spatially separated from each other within said atmospheric volume. For example, said three-dimensional shapes, spatially separated, may define a plurality of concentric transmissive and adjacent substantially opaque regions in the form of a zone plate. The opaque regions may be formed by heating and/or ionising the respective portions of the atmospheric volume to make them reflective.

The optical element generated by said selected portions may be a reflective device and the control system may be configured to cause electromagnetic radiation from said source to be applied to said selected plurality of three-dimensional portions so as to heat and/or ionise the air therein.

The atmospheric volume may be divided into an array of three dimensional portions, and said control system may be configured to cause said electromagnetic radiation from said source to be applied to said selected portions.

In some exemplary embodiments of the invention, the electromagnetic radiation source may comprise a beam steering mechanism for selectively steering a beam of electromagnetic radiation output therefrom, said control system being communicably coupled to said beam steering mechanism and configured to generate signals for steering said beam of electromagnetic radiation relative to said atmospheric volume so as to sequentially apply electromagnetic radiation to said selected portions. In alternative exemplary embodiment, the apparatus may comprise a beam splitting module for splitting a beam output from said electromagnetic radiation source into a plurality of paths corresponding to respective locations of selected portions.

In all of the above-mentioned cases, the electromagnetic radiation source may comprise one or more laser sources.

Some exemplary embodiments of the apparatus may further comprise an atmospheric element monitoring module for monitoring atmospheric conditions, generating data representative thereof, and transmitting said data to said control system which is further configured to adjust at least one characteristic of said electromagnetic radiation applied to said selected portions of said atmospheric volume so as to compensate for atmospheric distortion. The apparatus may further comprise a quality monitoring module for monitoring the performance (i.e. the properties and characteristics) of the atmospheric element against a predefined set of desired criteria, and generating signals to dynamically adjust beam steering/splitting and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric element is facilitated to create and maintain an atmospheric element having consistently desired characteristics and quality.

In accordance with another aspect of the present invention, there is provided a method of generating an atmospheric element operative to modify an electromagnetic radiation path in a long range electromagnetic radiation sensor, the method comprising dividing an atmospheric volume into a matrix of dimensional portions, applying electromagnetic radiation to the selected plurality of three-dimensional portions of the atmospheric volume so as to heat and/or ionise the air within said portions, wherein said selected portions are spatially located together in a substantially unbroken three-dimensional configuration corresponding to the three-dimensional shape of the electromagnetic radiation path modifying atmospheric element.

An aspect of the present invention extends further to a control system for apparatus as described above configured to be communicably coupled to said electromagnetic radiation source, said control system comprising a database on which is stored data representative of a three-dimensional matrix configuration of a plurality of three-dimensional elements, and a processor for mapping said stored three-dimensional matrix configuration of elements to an atmospheric volume, the processor being further configured to generate actuation signals configured to cause said electromagnetic radiation source to apply electromagnetic radiation to a selected plurality of portions of said atmospheric volume so as to heat and/or ionise the air therein and thereby define the electromagnetic radiation path modifying atmospheric element, said selected portions being spatially located together in substantially the same configuration as said stored three-dimensional matrix configuration of elements.

BRIEF DESCRIPTION OF THE DRAWINGS

These and other aspects of the present invention will be apparent from the following specific description in which embodiments of the present invention are described, by way of examples only, and with reference to the accompanying drawings, in which:

FIG. 3 is a schematic diagram illustrating the manner in which laser power may be applied to selected cells within a matrix to create an atmospheric optical element for use in a long range sensor according to a first exemplary embodiment of the present invention;

FIG. 4 is a schematic diagram illustrating an alternative manner in which laser power may be applied to selected cells within a matrix to create an atmospheric optical element for use in a long range sensor according to another exemplary embodiment of the present invention;

FIG. 7A is a schematic side view of the focussing arrangement of FIG. 7;

DETAILED DESCRIPTION

Thus, aspects of the present invention operate on the principle of using one or more laser devices to selectively alter the refractive index and/or cause ionisation of portions of a three-dimensional area of the atmosphere remote from the laser device(s) so as to create or simulate an optical component of a desired size and having selected optical properties for use as the primary objective optical element of a long range sensor apparatus.

Figure 1A:
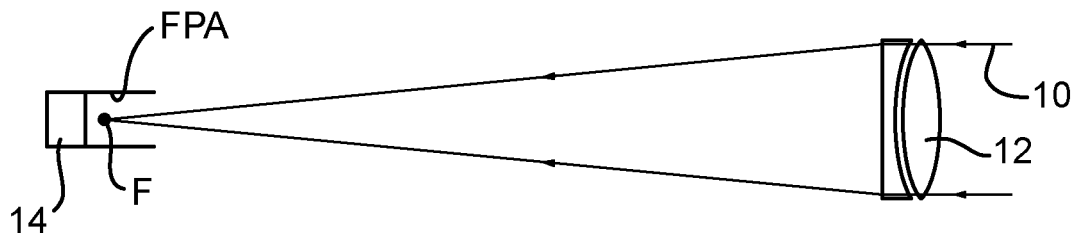
FIG. 1A is a schematic diagram illustrating the principle of operation of a refractive telescope.
Figure 1B:
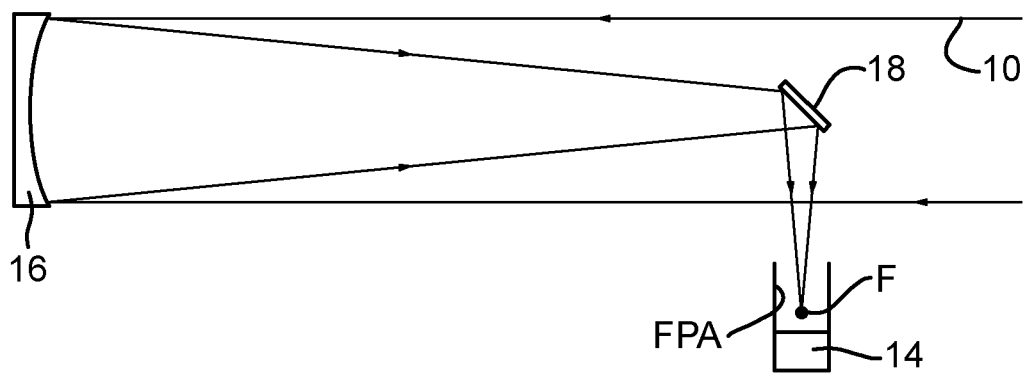
FIG. 1B is a schematic diagram illustrating the principle of operation of a reflective telescope.
Figure 1C:
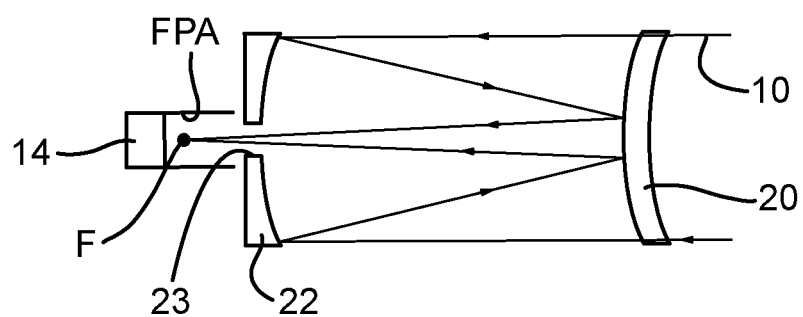
FIG. 1C is a schematic diagram illustrating the principle of operation of a catadioptric telescope.
Figure 2:
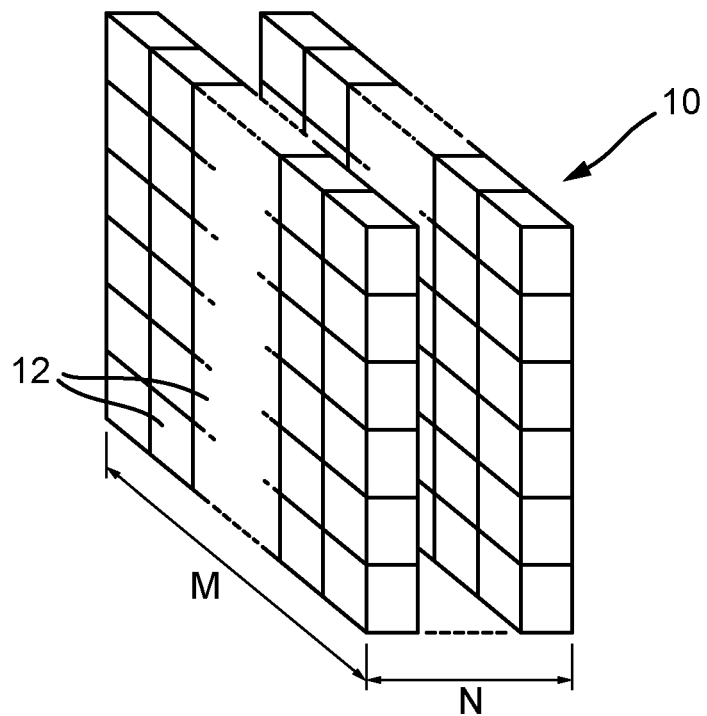
FIG. 2 is a schematic diagram illustrating the concept of an M by N cell matrix for the purposes of defining an atmospheric volume within which an atmospheric optical component may be created for use in a long range sensor apparatus in accordance with an exemplary embodiment of the present invention.

In general, and referring to FIG. 2 of the drawings, the area of the atmosphere in which an optical component is required to be created can be considered as a cell matrix 10 comprised of M rows and N columns or layers of 'cells' 12, wherein a cell is simply a predefined three-dimensional portion of the matrix. In the example shown, each cell is identical in size and shape, but this is not essential, and the present invention is not necessarily intended to be limited in this regard. It will also be appreciated that the number of cells in the vertical dimension of the cell matrix may vary. Thus, the cell matrix may be of any desired size, shape and number of cells.

Within the matrix 10, the three dimensional structure of an optical device can be defined in terms of a number of cells 12 in a desired configuration, and it is these cells that will then be targeted by the laser source in order to effect the desired change in their respective properties (either by ionisation or heating to cause a change in refractive index).

It is known that an increase in temperature of a volume of air causes a corresponding decrease in density of that volume of air. As a result, the refractive index of warm air is lower than that of cooler (and therefore denser) air. Thus, some aspects of the principles employed in the present invention operate on the principle that by providing a volume of air that is warmer than the air around it, that volume of air can cause refraction of a beam of electromagnetic radiation as it passes through, in a manner similar to a convergent or divergent lens.

It is also known that if an electric field of a sufficiently high power is applied to a volume of air, the air may be ionised. Ionised air has reflective properties over a range of electromagnetic radiation wavelengths, such properties being a function of density and the type of ionisation created. Thus, some aspects of the principles employed in the present invention operate on the principle that by ionising a volume of air can cause it to reflect a beam of electromagnetic radiation as it hits that volume, in a manner similar to a mirror or similarly reflective optical device. A mixture of the two principles can be used to create a diffractive element, as will be described in more detail later.

Thus, referring back to FIG. 2 of the drawings, it will be appreciated that by selectively heating or ionising cells 12 within the matrix 10 a three dimensional atmospheric optical component can be created using a high power electromagnetic radiation source. This may be achieved in a number of different ways. For example, a pulsed power laser (PPL) may be employed, and the 'Kerr' effect exploited therewith in order to attain self focussing of the laser beam at a required point (i.e. within the selected cell). Alternatively, a combination (i.e. crossing over) of two continuous wave (CW) laser beams at a required point may be used to achieve the desired effect. In any event, the lasers are configured to selectively heat or ionise the atmosphere, thus changing its refractive index and electromagnetic properties such that electromagnetic energy passing through the heated cells is refracted and/or electromagnetic energy hitting the ionised cells is reflected.

Thus, referring to FIG. 3 of the drawings, apparatus used to effect one exemplary embodiment of the present invention comprises at least one laser source 14 mounted in an enclosure 15. In the example shown, the laser source 14 is a pulsed power laser source configured to emit high power laser pulses toward the cell matrix 10 via a laser transparent aperture 16. An optically reflective device, i.e. mirror, 18 is mounted on a dual-axis actuator (not shown) in the main laser output path, the actuator being communicably coupled with a control system that is configured to cause the actuator (and, therefore, the mirror 18) to move thereby to selectively direct the laser output through the aperture 16 toward selected cells 12 of the matrix 10. The control system may, for example, be configured to cause the laser output to be scanned across the cell matrix providing a pulse (or more than one pulse) to each selected cell, either via a raster pattern or a pattern optimised to suit the type of optical component required to be created and its operational requirements.

As mentioned briefly above, the laser pulse is self-focussing by means of the 'Kerr' effect, thereby enabling it to deliver enough concentrated power to heat or ionise the cell at which it is directed. The Kerr effect is a change in the refractive index of a material in response to an applied electric field. In the case of a laser pulse of sufficiently high power, its electric field is sufficiently high to change the refractive index of the air. As a result, the cross-sectional area of the pulse (perpendicular to the direction of propagation) can be thought of as shrinking with distance (due to the differences in refractive index), thus bringing the pulse to an intense focus at some point down range of the laser, in this case at the selected cell. This intense focus is of sufficiently high intensity to heat or ionise the cell to change its refractive index and/or other optical properties. One or more pulses may be provided per cell, dependent upon the desired effect and environmental conditions. It may also be necessary to periodically re-supply laser pulses to all selected cells to maintain the required change in refractive index and other optical properties for as long as the optical component is required.

Referring to FIG. 4 of the drawings, apparatus that may be used in an alternative exemplary embodiment of the invention, two CW (continuous wave) laser sources 20, 22 may be provided in respective enclosures 24, 26, each having a laser transparent aperture 28, 30 therein. Once again, each laser system is provided with a mirror 32, 34 mounted on a dual-axis actuator (not shown) communicably coupled to a control system (not shown). Operation of the system is similar, in principle, to that described previously with reference to FIG. 3 of the drawings except, in this case, two (or more) spatially separated CW lasers (which may be mounted on the same platform or across different platforms) are used to selectively heat/ionise the atmosphere in each required cell. This is achieved by ensuring (through pointing) that the laser beams cross over at the same point (in the selected cell 12), thereby ensuring that sufficient power is attained. Such scanning may be performed on the basis of a control system configured to maintain a predetermined spatial separation and orientation between the atmospheric component and the electromagnetic radiation source. However, in an alternative exemplary embodiment, such scanning may be performed using a control system configured to direct the source(s) at specific coordinates corresponding to specific respective locations within the atmosphere.

In yet another exemplary embodiment, and either in addition to the above-mentioned arrangements or alternatively, it is envisaged that a beam splitter could be employed to split a laser beam into numerous new paths corresponding to the configuration of a plurality of respective cells to be targeted. Thus, a plurality of such cells could be targeted simultaneously without the need for scanning a single laser path across the cell matrix.

In the following, a number of exemplary atmospheric optical components that can be created in this manner will now be described, one or more of which could be used in a long range sensor apparatus according to any one of a number of exemplary embodiments of the present invention. However, it will be appreciated by a person skilled in the art that the principles set forth herein can be applied in numerous different ways in order to create different types and configurations of sensor, and the present invention is not necessarily intended to be limited in this regard.

Figure 5A:
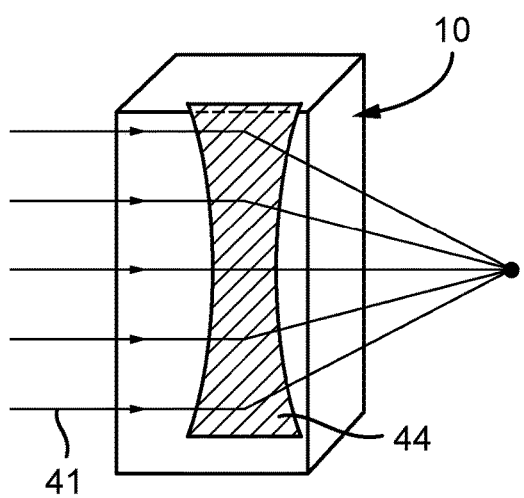
FIG. 5A is a schematic diagram illustrating an atmospheric converging lens for use in a long range sensor according to an exemplary embodiment of the present invention.
Figure 5B:
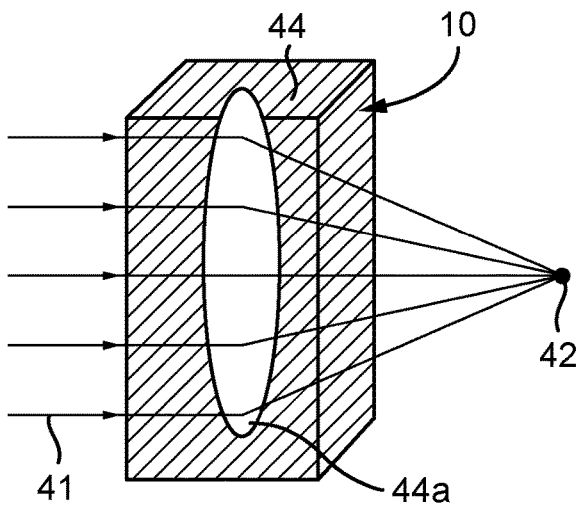
FIG. 5B is a schematic diagram illustrating an alternative atmospheric converging lens for use in a long range sensor according to an exemplary embodiment of the present invention.

Referring to FIG. 5A of the drawings, in one of its simplest forms, the principles described above may be employed to create an atmospheric converging lens. Thus, in this particular case, the three-dimensional 'structure' represented by the heated cells within the matrix 10 comprises a double concave lens structure, wherein the rays of an incoming beam 41 of electromagnetic radiation are 'bent' or refracted as they enter the atmospheric component 44 and converge to a focal point 42. In an alternative exemplary embodiment, a converging lens may be created by heating the cells surrounding a three-dimensional configuration of cells in the shape of a convex lens (similar in form to that of a conventional converging lens). Thus, the resultant atmospheric element would comprise a convex-shaped region of unheated cells surrounded by a body of heated cells, as shown in FIG. 5B of the drawings (wherein the shaded area 44 denotes the heated cells and the double convex lens region 44a is unheated). In yet another exemplary embodiment, the body of heated cells may form an annulus having, for example, a double convex cross-section.

In order to create the lens 44, 44a, the cells corresponding to the three-dimensional 'structure' of a double concave lens are heated, for example using one of the methods described above, thereby to reduce the refractive index of those cells relative to the surrounding cells, and cause the rays of an incoming beam 41 of electromagnetic radiation to be refracted as they enter the optical component 44, 44a and converge to a focal point 42. For the avoidance of doubt, it will be appreciated that the optical component is defined by a three-dimensional area within the cell matrix comprised of a plurality of atmospheric cells, each of which has been heated in order to attain the required refractive index. A control system may be employed to ensure that the correct amount of laser power is applied to each cell in order to attain the required level of heating, having regard to environmental factors and the refractive index change required to be achieved. When the optical component is no longer required, the laser power can simply be removed, and the atmospheric cells will quickly return to their normal state.

In the case described above with reference to FIGS. 5A and B of the drawings, the refractive index of the heated cells forming the lens structure is substantially constant, and varying optical properties can be achieved by the geometry of the component (i.e. size, profile, thickness). In other words, as with a physical component, it is just the geometry of the three dimensional volume of heated cells that defines the function of the resultant lens.

Figure 6:
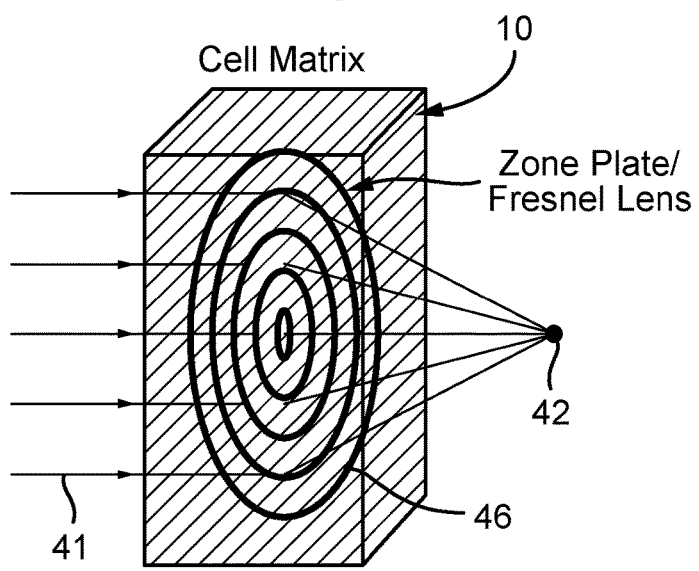
FIG. 6 is a schematic diagram illustrating an atmospheric Fresnel zone plate created for use in a long range sensor according to an exemplary embodiment of the present invention.

Referring now to FIG. 6 of the drawings, in other exemplary embodiments of the present invention, diffractive and refractive properties may be combined in order to create more complex configurations of atmospheric optical components for use in a long range sensor. In the illustrated example, a Fresnel zone plate 46 is defined substantially diagonally across the cell matrix 10. The zone plate 46 is formed of concentric rings of heated cells, diametrically separated by unheated cell areas; or it may be formed of concentric rings of ionised (reflective) cells diametrically separated by heated (or unheated) cells (transmissive). The resultant component combines refraction with the diffractive effects from boundaries between regions of significantly different refractive index and/or electromagnetic properties. Thus, it can be seen that more complex optical components can be created by varying both the geometry and the refractive indices within the atmospheric 'structure'.

Figure 7:
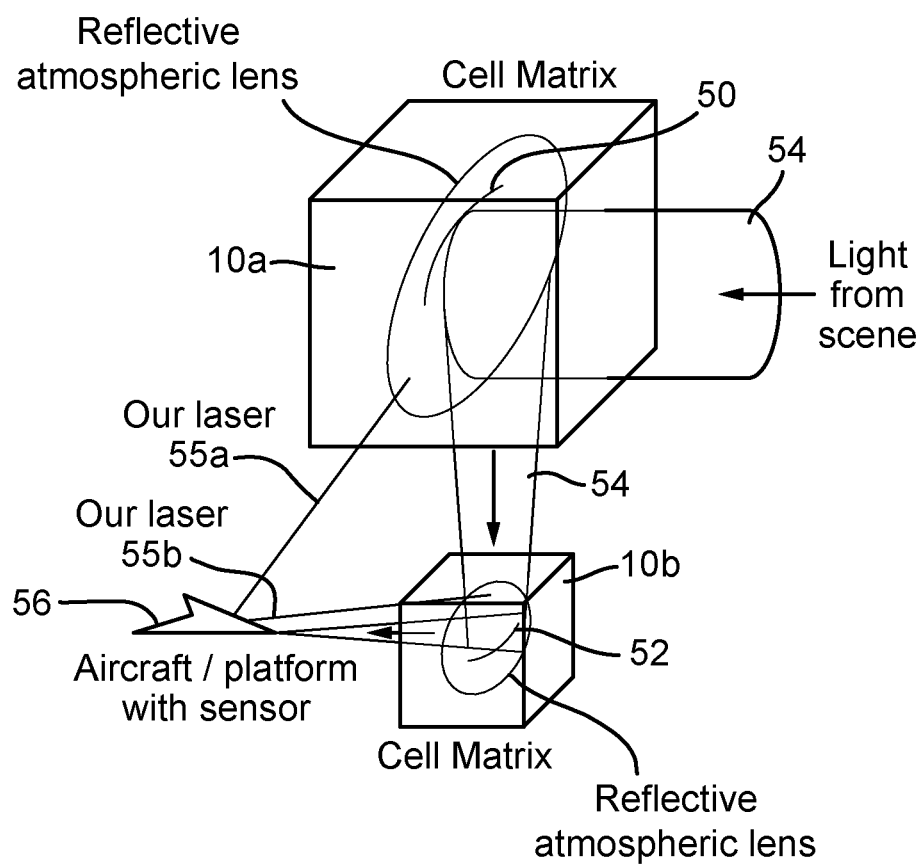
FIG. 7 is a schematic diagram of a focussing arrangement employing atmospheric reflective components for use in a long range sensor apparatus according to an exemplary embodiment of the present invention.

As explained above, it is also possible to simulate optically reflective components and arrangements for use in sensors according to various exemplary embodiments of the present invention. Thus, referring to FIGS. 7 and 7A of the drawings, a focussing arrangement is illustrated which is comprised of two reflective atmospheric lenses 50, 52. In this case, two spatially separated cell matrices 10a, 10b are defined, both of which are three-dimensional concave elements (relative to the incoming beam of electromagnetic radiation 54).

The atmospheric reflective lenses 50, 52 are formed by ionisation of selected cells (in a configuration matching the required 'structure' and orientation of the respective lenses within the cell matrices 10a, 10b. In the example illustrated, the ionisation of the cells for both lenses may be effected by means of laser sources 55a, 55b mounted in or on the same platform, such as an aircraft 56 or the like. In use, an incoming beam 54 of electromagnetic radiation, such as light from a scene, for example, hits the first reflective lens 50 and is reflected and converged toward the second reflective lens 52. The beam 54 is then reflected and converged by the second reflective lens 52 toward a receiver on the platform 56, as shown.

In the examples illustrated, the cell matrices 10a, 10b are 'upright' and the orientation of the atmospheric optical elements I achieved by the pattern of the ionised/heated cells. However, it will be appreciated that, in alternative exemplary embodiments of the invention, the cell matrix itself may be oriented to match the required orientation of the optical element and, in this case, the populated cell pattern (relative to the cell matrix) will always be the same for a particular optical element of a specified size. Also, it will be appreciated that a more 'curved' profile of the optical elements thus created may be achieved by varying the degree of heating/ionisation in the peripheral populated cells.

Figure 8:
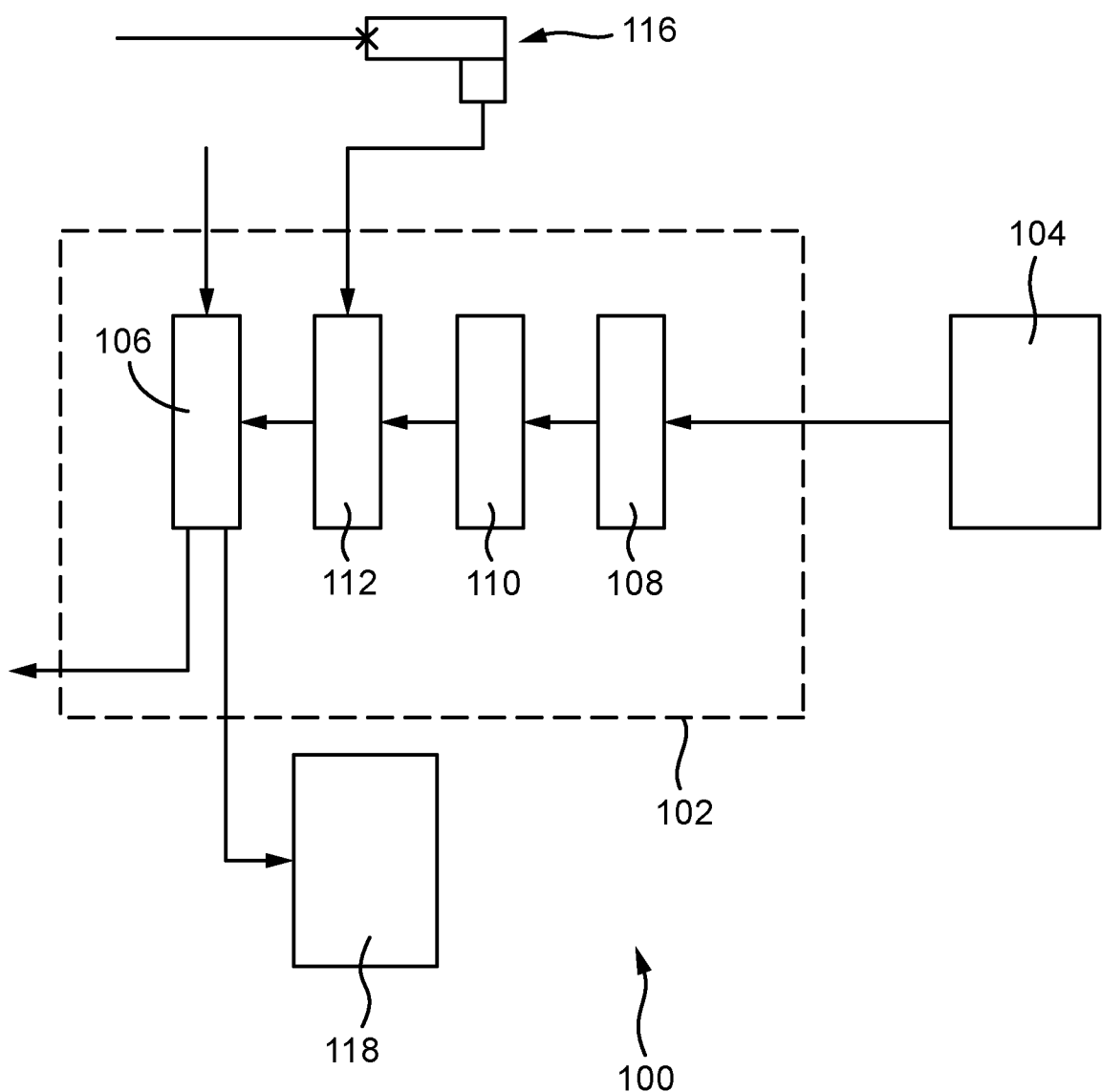
FIG. 8 is a schematic block diagram illustrating apparatus for creating an atmospheric optical component in a long range sensor apparatus according to an exemplary embodiment of the present invention.

Referring to FIG. 8 of the drawings, an apparatus for use in a long range sensor in accordance with an exemplary embodiment of the present invention for creating the primary objective optical element for electromagnetic radiation 'collection' comprises a control module 100 communicably coupled to, for example, a dual-axis actuator on which a reflective component is mounted within a laser system such as that described above with reference to FIGS. 3 and 4 of the drawings. Such a laser system may, for example, be mounted in or on an airborne platform such as a manned aircraft or UAV, or it may be provided as part of a telescope arrangement, for example.

The control module 100 comprises a processor 102 communicably coupled to a database 104. The database has stored therein data representative of one or more cell matrices, representative of respective atmospheric volumes, and the cells therein that need to be 'populated' (i.e. heated or ionised) in order to construct a respective three-dimensional atmospheric optical element. Such data may also include information as to the degree of ionisation/heating required to be maintained in order to achieve the required optical characteristics of the element. It will be appreciated that the database may simply include a single 'template' or populated cell matrix, bespoke to the platform or application in which the respective atmospheric optical element is to be used. However, in alternative exemplary embodiments, the database may include a plurality of different such templates from which a required optical component can be selected for use, as required.

The processor 102 includes an input and an interface 106 for receiving an actuation signal indicative that an atmospheric optical component is required to be created, together with data representative of the size and orientation of the required optical component. The actuation signal and accompanying data may be manually entered by an operative, but may equally be automatically generated in response to detection of an electromagnetic signal required to be received on the platform or deflected/diverted therefrom.

The processor 102, in response to the actuation signal, searches the database 104 for the populated cell matrix data corresponding to the atmospheric optical component required to be created, and retrieves the associated data. A transformation module 108 is provided, which transforms the matrix cell data onto data representative of the real atmospheric matrix cell within which the optical component is to be created, both in terms of size and orientation thereof, and determines precise coordinates for the location of each real atmospheric cell relative to the corresponding respective cell of the stored matrix, and a mapping module 110 maps the respective population data from the stored cell matrix onto the data representative of the real atmospheric cell matrix accordingly. Thus, the processor now knows the precise physical location of each cell in the real atmospheric cell matrix and the cell 'population' pattern required to create the optical component. Finally, such data is converted, by a signal processing module 112, into a scanning pattern comprised of a pattern of actuation signals configured to move and actuate the laser beam(s) in order to selectively heat/ionise the real atmospheric cell matrix in the required pattern (and to the required degree)n to create the three-dimensional atmospheric optical element. In other words, the actuation signals are configured to control the power and beam steering/splitting of the laser source(s) to heat/ionise each selected cell as required.

Furthermore, an atmospheric lens monitoring system 116 may be provided within, or communicably coupled to, the control module 100. The atmospheric lens monitoring system 116 may, for example, comprise a low power laser of a suitable wavelength (as will be apparent to a person skilled in the art) to detect atmospheric effects. Thus, the monitoring system 116 may form part of a feedback loop with the signal processing module 112 to enable the actuation signals to be adjusted to compensate for atmospheric distortion. In alternative exemplary embodiments, the apparatus may comprise a quality monitoring module for monitoring the performance (i.e. the properties and characteristics) of the atmospheric element against a predefined set of desired criteria, and generating signals to dynamically adjust beam steering/splitting and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric element is facilitated to create and maintain an atmospheric element having consistently desired characteristics and quality.

Figure 9:
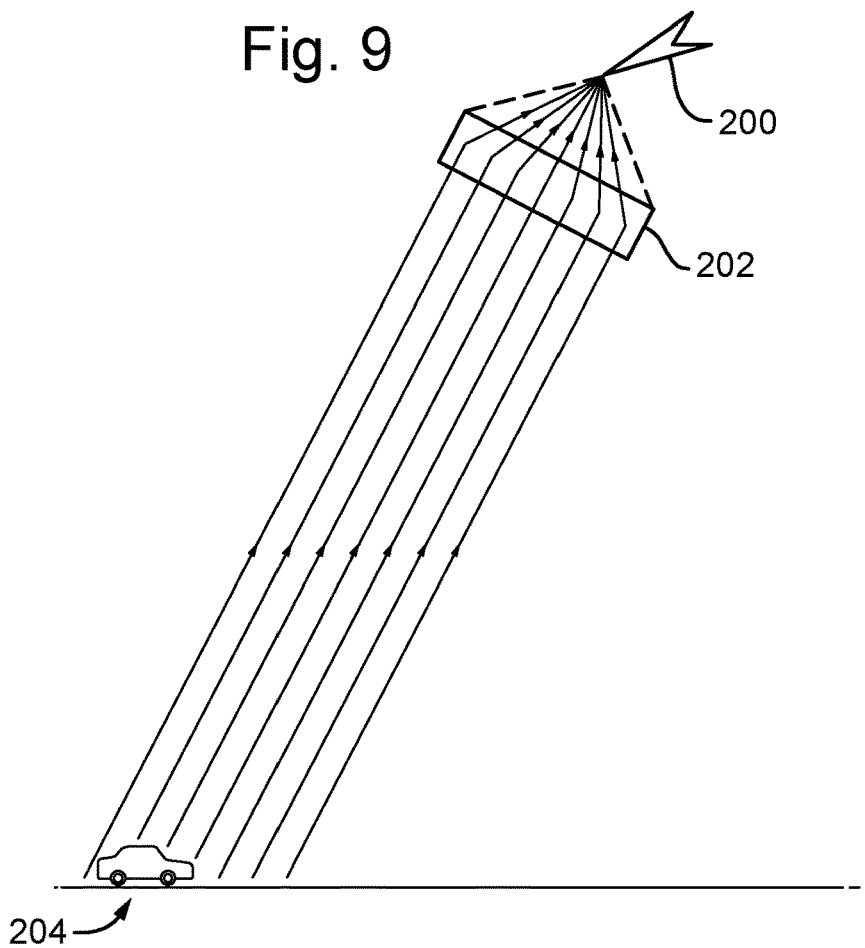
FIG. 9 is a schematic diagram illustrating a long range sensor apparatus according to an exemplary embodiment of the present invention.

Referring to FIG. 9 of the drawings, a long range sensor according to an exemplary embodiment of the present invention comprises one or more laser sources mounted on an airborne platform 200. Also provided in or on the platform 200 is an optical sensing system or large aperture telescope (not shown) including one or more image sensors, such as a focal plane array (FPA) or the like, located on the focal plane defined by the optical system. The optical sensing system may include an optical arrangement for converging and focusing incoming light toward the focal plane, as required.

The laser sources are used in the manner described above to create a large atmospheric converging lens 202 between the optical sensing system and a scene 204 to be imaged. In this case, the converging lens 202 may be a refractive lens whereby selected cells of the above-described matrix have been heated by the laser source in order to change their refractive index relative to the surrounding atmosphere. In alternative embodiments, the lens may be a more a complex lens, as described above, wherein portions of the atmospheric volume are ionised to create reflective regions. It will be appreciated that the size of the atmospheric lens 202 is limited primarily only by the laser power available on the platform, and the larger the lens, the greater will be the performance of the long range sensor. The distance from the platform 200 at which the atmospheric lens 202, which may be refractive or diffractive in this case (or even reflective in some exemplary embodiments of the invention), is created is dependent on a number of factors, including the laser power available on the platform: the further away the lens is required to be created, the greater the power required to heat/ionise the cells and also to maintain that heat/ionisation for as long as the lens is required. Of course, it also depends on the degree of convergence required: obviously, for a certain size of lens, there will be a fixed focal length, and this must be about equal to the distance between the lens 202 and the optical system mounted in or on the platform 200.

In use, light from a scene 204 is captured by the atmospheric lens 202 and converged toward the optical system in or on the platform 200. Thus, the atmospheric lens 202 forms part of an extended optical system and acts as a very large aperture, focussing photons from the scene down to an appropriately sized lens/mirror/other optical arrangement provided as part of the on-board optical imaging system, thus enabling a significant increase in range performance. It will be appreciated that a system of this type and configuration is not limited to visible frequencies and may equally be adapted for use in a sensor for radar or infrared signals.

Figure 10:
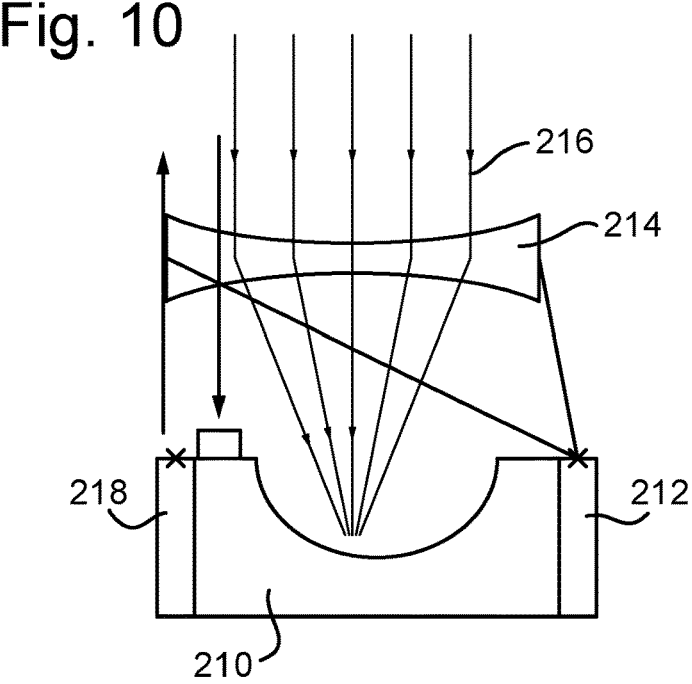
FIG. 10 is a schematic diagram illustrating a telescope arrangement according to another exemplary embodiment of the present invention.

Referring to FIG. 10 of the drawings, a long range sensor in the form of a telescope 210 according to an exemplary embodiment of the present invention is provided with one or more laser sources 212 configured to create an atmospheric primary objective lens 214 in the manner described above. The lens 214, which may be diffractive or refractive (or even reflective in some exemplary embodiments of the invention), once again operates to collect light 216 and converge it toward the telescope's optical system (not shown). In this case, and all other exemplary embodiments, a secondary, low power laser source 218 may be provided for transmitting laser pulses/CW laser beams into the atmosphere and collecting returned radiation therefrom, which is indicative of any atmospheric distortion caused, for example, by particulate matter or gases therein, or the dynamic behaviour of the devices themselves which creates turbulence. The data from such an atmospheric monitoring system, which is known in the art, can be fed back to the atmospheric lens control system such that adjustment/compensation can be made for atmospheric conditions so as to optimise the quality of the atmospheric lens 214. As described above, a quality monitoring module may also be provided for continuously monitoring the quality of the atmospheric lens and successively 'fine tuning' it.

It will be appreciated by a person skilled in the art from the foregoing description that modifications and variations can be made to the described embodiments without departing from the scope of the invention as defined by the appended claims. Indeed, it will be appreciated that numerous variations are possible in terms of the shape and configuration of the three dimensional heated/ionised cell combinations in order to define any desired atmospheric optical component and thus define the range and angular resolution of a long range sensor within much wider constraints.

The invention claimed is:

1. A long range electromagnetic radiation sensor apparatus comprising a sensing system for receiving electromagnetic radiation signals from an object or area of interest and at least one electromagnetic radiation sensor, the apparatus further comprising an electromagnetic radiation source and a control system configured to cause electromagnetic radiation from said source to be applied to a selected plurality of three-dimensional portions of an atmospheric volume between an optical system and said object or area of interest so as to heat and/or ionise the air within said portions, wherein said selected portions are spatially located together in a three-dimensional configuration so as to generate an electromagnetic radiation path modifying atmospheric element for capturing said electromagnetic signals from said object or area of interest and directing and/or converging said captured signals toward said electromagnetic radiation sensor of said sensing system.

2. The apparatus according to claim 1, wherein the selected portions are spatially located together in a substantially unbroken three-dimensional configuration corresponding to the three-dimensional shape of the generated electromagnetic radiation path modifying atmospheric element.

3. The apparatus according to claim 1, the selected portions are configured such that non-selected portions are in a configuration corresponding to a three-dimensional shape of the generated electromagnetic radiation path modifying atmospheric element.

4. The apparatus according to claim 1, wherein the sensing system is an optical system, and the electromagnetic radiation path modifying atmospheric element generated by said selected portions is an optical lens, wherein the control system is configured to cause electromagnetic radiation from said source to be applied to said selected plurality of three-dimensional portions so as to heat and/or ionise the air therein and change the refractive index thereof.

5. The apparatus according to claim 4, wherein said optical lens generated by the selected portions is a converging lens and said selected portions are spatially located together in a concave lens configuration.

6. The apparatus according to claim 4, wherein said optical lens generated by the selected portions is a converging lens and non-selected portions are spatially located together in a convex lens configuration.

7. The apparatus according to claim 1, wherein the electromagnetic radiation path modifying atmospheric element generated by said selected portions is a reflective device and the control system is configured to cause electromagnetic radiation from said source to be applied to said selected plurality of three-dimensional portions so as to heat and/or ionise the air therein.

8. The apparatus according to claim 1, wherein the atmospheric volume is divided into an array of three dimensional portions, and said control system is configured to cause said electromagnetic radiation from said source to be applied to said selected portions.

9. The apparatus according to claim 8, wherein the electromagnetic radiation source comprises a beam steering mechanism for selectively steering a beam of electromagnetic radiation output therefrom, said control system being communicably coupled to said beam steering mechanism and configured to generate signals for steering said beam of electromagnetic radiation relative to said atmospheric volume so as to sequentially apply electromagnetic radiation to said selected portions.

10. The apparatus according to claim 8, comprising a beam splitting module for splitting a beam output from said electromagnetic radiation source into a plurality of paths corresponding to respective locations of selected portions.

11. The apparatus according to claim 1, wherein the electromagnetic radiation source comprises one or more laser sources.

12. The apparatus according to claim 1, comprising an atmospheric element monitoring module for monitoring atmospheric conditions, generating data representative thereof, and transmitting said data to said control system which is further configured to adjust at least one characteristic of said electromagnetic radiation applied to said selected portions of said atmospheric volume so as to compensate for atmospheric distortion.

13. The apparatus according to claim 1, comprising a quality monitoring module for monitoring the performance of the electromagnetic radiation path modifying atmospheric element against a predefined set of desired criteria, and generating signals to dynamically adjust beam steering/splitting and/or power of the electromagnetic radiation source so as to reduce or eliminate deviation of the properties and characteristics of the atmospheric element from that which is defined by the predefined criteria.

14. A method of generating an atmospheric element operative to modify an electromagnetic radiation path in a long range electromagnetic radiation sensor, the method comprising dividing an atmospheric volume into a matrix of three dimensional portions, applying electromagnetic radiation to the selected plurality of three-dimensional portions of the atmospheric volume so as to heat and/or ionise the air within said portions, wherein said selected portions are spatially located together in a substantially unbroken three-dimensional configuration corresponding to a three-dimensional shape of a electromagnetic radiation path modifying atmospheric element.

15. A control system for apparatus according to claim 1 configured to be communicably coupled to said electromagnetic radiation source, said control system comprising a database on which is stored data representative of a three-dimensional matrix configuration of a plurality of three-dimensional elements, and a processor for mapping said stored three-dimensional matrix configuration of elements to an atmospheric volume, the processor being further configured to generate actuation signals configured to cause said electromagnetic radiation source to apply electromagnetic radiation to a selected plurality of portions of said atmospheric volume so as to heat and/or ionise the air therein and thereby define the electromagnetic radiation path modifying atmospheric element, said selected portions being spatially located together in substantially the same configuration as said stored three-dimensional matrix configuration of elements.

* * * * *